Patented Mar. 14, 1950

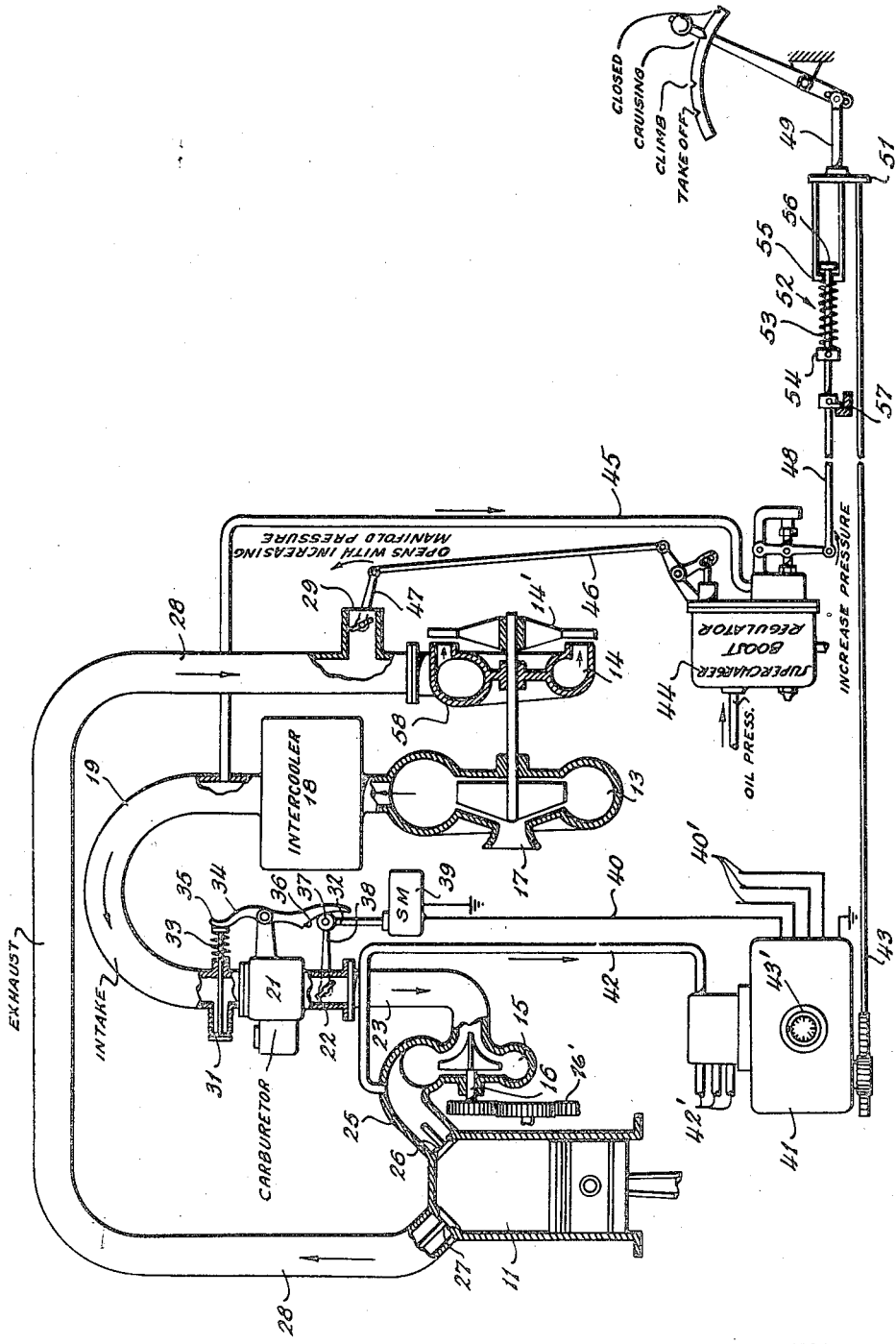

2,500,234

UNITED STATES PATENT OFFICE 2,500,234

COMPRESSOR SURGE CONTROL FOR EXHAUST TURBINE DRIVEN SUPERCHARGERS

Mortimer F. Bates, Brooklyn, N. Y., assignor to The Sperry Corporation, a corporation of Delaware Application February 12, 1944, Serial No. 522,051

2 Claims. (Cl. 60—13)

My invention relates to blower-chargers and supercharger systems for supplying gaseous or vaporized fuel to prime movers.

It is an object of the invention to provide improved control systems for aircraft and improved methods of operation of supercharged aircraft engines at various altitudes.

It is an object of the invention to provide an improved blower-charger system for a prime mover, and especially to provide an improved power plant for aircraft.

An object is to provide an improved system for charging an internal combustion engine with an exhaust-driven blower-charger.

Another object is to provide methods and apparatus for preventing the stalling of aircraft engines at high altitudes at partially closed throttle.

Another object is to avoid disturbing effects from part-throttle settings and to obtain operation of a supercharger at maximum efficiency regardless of the power demands of an aircraft.

Another object is to provide arrangements for overcoming the phenomena known as "pumping" or pressure pulsations in a turbo-blower for internal combustion engines.

A further object is to provide arrangements for maintaining airflow from an exhaust-driven blower.

Still another object is to provide an arrangement for bleeding sufficient air to maintain reasonably uniform blower output pressure.

Another object is the control of relationship between the amount of air bled and the throttle opening.

Another object is to provide a power system in which intake manifold pressure is controlled.

Another object is to provide arrangements for avoiding engine detonation caused by pulsation in intake pressure.

It is also an object to provide arrangements for permitting sudden opening or closing of the throttle of an engine without interfering with the proper operation of the engine either at high or low altitudes.

Other and further objects and advantages will become apparent as the description proceeds.

When an exhaust-driven blower-charger for an aircraft operates at high speed, particularly at high altitudes or when the intake pipe of the engine is partially throttled, cutting down the air flow from the blower, there is a tendency for a surging of the body of air in the supercharger conduits. It is desirable to avoid such surging and attendant pressure pulsation in order to avoid ruining the engine by detonation. In addition, it is necessary to avoid permitting such surging to become so great as to cause virtually a momentary stoppage of air and gases through the engine and exhaust pipe. Such a momentary stoppage of exhaust would leave the exhaust turbine without any driving power, causing the blower-charger to stop. If this takes place at high altitude, the engine may stall and cannot be restarted in the rarefied upper altitude atmosphere.

It is accordingly an object of the invention to provide reliable, safe operation of a supercharged gas engine under all conditions of operation.

In accordance with my invention in its preferred form, I utilize a power plant for an aircraft comprising an internal combustion engine with a first stage blower driven by an exhaust turbine and a second stage blower mechanically driven by the engine shaft. In the airline between the first and second stage blowers, I provide an opening leading to an air-waste gate. I provide an intake manifold pressure-responsive device for simultaneously controlling the air-waste gate and the engine throttle to maintain a predetermined intake manifold pressure. The air-waste gate and the throttle are preferably so interconnected that one opens as the other closes. In this manner I obtain compensation for the effect on the turbo compressor of opening or closing the throttle to meet the changing demands for horse-power output.

A better understanding of the invention will be afforded by the following detailed description considered in conjunction with the accompanying drawing, in which the single figure is a schematic diagram of one embodiment of my invention.

In the drawing, one of the engines of an aircraft is represented schematically by a single cylinder 11.

Two blower stages are provided for supplying intake air to the engine at sea level pressure up to the critical altitude, such as 22,000 or 28,000 feet, at which the intake air pressure falls off but is considerably above the pressure of the rarefied air at high altitude. As shown, there is a first stage blower 13, an exhaust turbine 14 for driving the blower 13, and a second stage blower 15 which is driven by the engine through suitable gearing 16' and a shaft 16.

The air and gas conduit system includes the blower 13 with its intake opening 17, an intercooler 18, a connecting pipe 19, a carburetor 21 including a throttle 22 of the butterfly-valve type, additional connecting piping 23, the second stage blower 15, an engine intake manifold 25 shown as leading to an engine intake port 26, the engine represented by the cylinder 11 with an exhaust port 27, an exhaust pipe 28, the nozzle box of the exhaust-driven turbine 14, and the turbine rotor 14'. In order to permit controlling the speed of exhaust turbine 14', an exhaust waste gate 29, shown as being of the butterfly-valve type, may be provided in the exhaust pipe 28.

The elements of the drawing thus far enumerated are in accordance with the present practice of certain aircraft installations and do not themselves constitute my invention. In order to improve the efficiency, the reliability and safety of operation of such a system, I provide a pressure relief valve 31, which is connected to the pipe 19 between the inter-cooler 18 and the carburetor 21. It may, however, be placed anywhere in the induction system ahead of the carburetor.

The throttle 22 is represented schematically as being controlled by a rod 32 which opens the throttle when moved downward and closes the throttle when moved upward. Suitable means are provided for coordinating the operation of the pressure relief valve 31 with the operation of the throttle 22. Furthermore, the relief valve 31 is preferably so constructed that it relieves the pressure in the pipe 19 in case of obstructions in the induction system beyond the valve 31, regardless of the setting of the throttle 22. For example, the relief valve 31 may be provided with a spring 33 which normally holds it closed. A valve lifter 34 may be provided having a foot 35 adapted to engage the valve stem of the valve 31 for opening the valve and a cam surface 36 adapted to cooperate with a roller 37 carried by the operating arm 38 of the throttle 22. The arrangement is such that when the rod 32 is raised to close the throttle, the valve lifter 34 lifts the valve 31 to open the pipe 19 to atmosphere.

Although the throttle 22 may be operated manually, it is desirable, particularly in the case of multi-engine aircraft, to provide an adjustable automatic throttle control, for example, one of the type for controlling the engine speed and power indirectly by controlling the intake manifold pressure. I may use an adjustable throttle control of the type shown in my Patent No. 2,255,753, granted September 16, 1941. Such a throttle control mechanism is represented schematically in the drawing of the present application by a box 41. The throttle control mechanism 41 includes electrical switch means (not shown) for causing motion in one direction or the other of a plurality of small servomotors in response to changes in intake manifold pressure. Only one of such servomotors, viz. the motor 39, is shown in the drawing. The motor 39 is arranged to operate the push rod 32. An electric control wire 40 is provided for connecting the servomotor 39 to the control device 41, and other control wires 40' are provided for the remaining servomotors (not shown). The control device 41 also includes connections to a plurality of tubes 42 and 42' and a pressure-setting rod 43 with an indicator 43' for showing the intake manifold absolute pressure being held. As shown, the tube 42 is connected to the intake manifold 25, and the rod 32 is connected to the throttle-operating arm 38. It will be understood that in a multi-engine installation, the remaining electric wires 40' and the remaining pressure tubes 42' will each be connected to the corresponding points of one of the other aircraft engines.

For controlling the operation of the exhaust turbine 14 to maintain a predetermined pressure in the compressor output conduit 19, I provide a supercharger "boost" regulator 44 of a well known form. The regulator 44 includes a connection to a pressure tube 45 which is connected to the output conduit 19, of the compressor, an operating link 46 which is connected to an arm 47 for actuating the exhaust waste gate 29, and a control rod 48 for setting the pressure to be maintained. The regulator 44 is of the balanced or null type, including a suitable mechanism such as a hydraulic servo using oil pressure for moving the rod 46 in one direction or the other, in case of unbalance between the pressure communicated by the tubing 45 and the pressure for which the regulator 44 is set, e. g., sea-level atmospheric pressure, when the rod 48 is in the normal operating or "cruising" position. It includes a spring (not shown) which may be stressed, causing the device 44 to operate in a direction to close the exhaust waste gate and thus "boost" the pressure maintained in the output conduit 19, when the rod 48 is moved to the right to a "boost" or "take-off" position. The supercharger "booster" regulator 44 is not my invention and may be of the type supplied by the General Electric Company with General Electric Exhaust Superchargers, or may take the form illustrated in Fig. 42 on page 227 of the volume Aircraft Power Plant Manual, by G. B. Manly, published by F. J. Drake Company, in 1943. The tube 45 corresponds to the tube connected to the manifold chamber in the regulator illustrated by Manly, the rod 46 corresponds to the rod connected to the throttle operating piston, and the setting adjustment rod 48 corresponds to the rod for setting cruising and take-off positions in the apparatus illustrated by Manly.

In order to avoid the necessity for having the pilot set the regulators 41 and 44 separately for take-off, for cruising and for different altitudes, a single adjusting or setting rod 49 may be provided which includes a non-yielding connection 51 to the intake manifold pressure setting rod 43 and a yieldable connection 52 to the setting rod 48 of the supercharger "booster" regulator 44. The yieldable connection 52 comprises a compression spring 53 retained between a collar 54 secured to the rod 48 and a collar 55 secured to the rod 49, the rod 48 having a button 56 secured to the end thereof for causing the rod 48 to follow the master setting rod 49 when the latter is moved to the right but permit yielding of the spring 53 when the rod 49 is moved to the left. Preferably, a limit stop 57 is provided to prevent the regulator 44 from being adjusted to a position corresponding to less than sea level atmospheric pressure.

The arrangement is such that when the rods 43 and 48 are moved to the right, the pressures which the regulators 41 and 44 respectively endeavor to maintain are increased, and when the rods 43 and 48 are moved to the left, the opposite actions take place.

In the control system pictured, I have shown my manifold pressure responsive device for the throttle control of multi-engined aircraft in conjunction with a turbo supercharger regulator of a conventional individual engine type.

When the aircraft utilizing the power plant illustrated in the drawing is operated at altitudes below a predetermined critical altitude depending on the type of aircraft and the altitude, for example, 22,000 feet, the intake manifold pressure setting rod 43 is set at the manifold pressure position which gives the desired power output. The pressure relief valve 31 is automatically moved partially open at part-throttle so as to permit maintaining the ratio of flow to rotational speed in the blower 13 established by the supercharger "booster" regulator 44. The cam surface 36 may be shaped to provide any desired predetermined ratio between throttle opening and relief-valve closing.

If the engine is delivering less power than that corresponding to the intake manifold pressure for which the rod 43 is set, the throttle control rod 32 will move downward, opening the throttle 22 and correspondingly closing the pressure relief valve 31. This action increases the pressure in the pipe 19 both by reason of the fact that the throttle opening is increased to admit additional charging pressure to the intake manifold 24 and by virtue of the fact that the pressure relief valve 31 is more nearly closed. When the aircraft is operated at sea level where the intake air is dense and a single stage of blower charging will be sufficient to supply pressure, it will be evident that the desired intake manifold pressure is furnished with a partially closed throttle and with the output of the first stage blower 13 greatly reduced by partial opening of the exhaust waste gate 29. This action results from the fact that the supercharger "booster" regulator 44 is normally so set as to maintain substantially sea level pressure in the pipe 19.

Closing the throttle 22 diminishes the horse-power output and, therefore, diminishes the energy available at the nozzle-box 58 to drive the turbine 14. However, there is a lag in this effect, which the pressure relief valve 31 takes care of. Therefore, a cam contour can be arrived at, which will not lower the output of the blower 13 to such an extent that manifold pressure falls below the new setting made.

It will be observed that the manifold pressure control device 41 responds directly to the pressure in the intake manifold 25 which is beyond the throttle in the induction system, whereas the supercharger regulator 44 is balanced against the output pressure of the first stage exhaust-driven blower 13. Under normal operation, automatic regulation of the waste gate 29 maintains sea-level pressure within the exhaust manifold nozzle-box 58 of the gas turbine 14 up to the critical altitude, when the turbine 14 and the blower 13 reach the limit of their capacity. However, at sea level for take-off, or below critical altitude in cases of emergency, the regulator 44 may be adjusted for "boost" pressures by moving the rod 49 considerably to the right. For example, at take-off a boost pressure of ten pounds per square inch above atmospheric in the manifold 25 may be desired.

Since the blower 13 is operated with a ratio of air flow to speed controlled by the supercharger regulator 44, it operates at maximum efficiency, and there is no danger of surges taking place in the air conduit system in the case of sudden closing or changing of the setting of the throttle 22.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A supercharging system for internal combustion engines comprising a blower, a first pipe by which air is supplied under pressure from the blower to the engine, an exhaust gas driven turbine connected to drive the blower, a second pipe by which the exhaust gases of the engine are supplied to the turbine, a pressure relief valve in said first pipe, a throttle in said first pipe between the valve and the engine, a gate to the atmosphere in said second pipe, means responsive to the pressure in said first pipe operatively connected to the valve and the throttle to simultaneously open one as the other closes and vice versa, means for adjusting the pressure at which said valve operating means is effective, means responsive to the pressure in said first pipe operatively connected to the gate to control the output pressure of the blower, means for adjusting the pressure at which said gate operating means is effective, and a mechanism for simultaneously setting the valve adjusting means and the gate adjusting means having a fixed connection to the throttle and a yieldable connection to the gate operating means with a limit stop that prevents the blower from operating at less than a predetermined output pressure.

2. An aircraft power system for an internal combustion engine comprising an exhaust turbine, a connection between said turbine and the engine, a blower driven by the exhaust turbine, an input connection from the blower to the intake manifold of the engine having a pressure relief valve therein, a throttle interposed in said input connection, a throttle control mechanism with an adjustable pressure setting, an air waste gate in the connection between the turbine and the engine, means for causing said relief valve to open as the throttle closes and vice versa in response to said throttle control mechanism, means for operating said waste gate to control the turbine to maintain a predetermined output pressure of the blower, and means having a fixed connection to the throttle control mechanism and a yieldable connection to said turbine controlling means for providing a common adjustment setting for said relief valve and said air waste gate.

MORTIMER F. BATES.

REFERENCES CITED

The following references are of record in the file of this patent:

UNITED STATES PATENTS

| Number | Name | Date |
|---|---|---|
| 1,346,124 | Guerrlich | July 13, 1920 |
| 1,774,738 | Vought | Sept. 2, 1930 |
| 1,955,799 | Fielden | Apr. 24, 1934 |
| 2,139,090 | Lysholm et al. | Dec. 6, 1938 |
| 2,283,694 | Perrine | May 19, 1942 |
| 2,305,810 | Müller | Dec. 22, 1942 |
| 2,355,759 | Stokes | Aug. 15, 1944 |
| 2,380,777 | Moss | July 31, 1945 |

FOREIGN PATENTS

| Number | Country | Date |
|---|---|---|
| 495,472 | France | Oct. 9, 1919 |